Aug. 30, 1932.   C. R. PATON   1,874,609
MOTOR VEHICLE
Filed March 29, 1930   3 Sheets-Sheet 1

INVENTOR.
Clyde R. Paton
BY
ATTORNEY

Aug. 30, 1932.  C. R. PATON  1,874,609
MOTOR VEHICLE
Filed March 29, 1930   3 Sheets-Sheet 3

INVENTOR.
Clyde R Paton
BY P. W. Pomeroy
ATTORNEY

Patented Aug. 30, 1932

1,874,609

UNITED STATES PATENT OFFICE

CLYDE R. PATON, OF SOUTH BEND, INDIANA, ASSIGNOR TO THE STUDEBAKER CORPORATION, OF SOUTH BEND, INDIANA, A CORPORATION OF NEW JERSEY

MOTOR VEHICLE

Application filed March 29, 1930. Serial No. 440,021.

This invention relates to motor vehicles and particularly to means for mounting certain of the parts thereof whereby the vibrations of the chassis frame are not apparent to the occupants of the vehicle.

In motor vehicles as used at the present time, the fenders and radiators are rigidly secured to the chassis frame with the result that any vibrations and torsional movement of the frame are transmitted to the vehicle parts rigidly connected therewith and such vibrations are annoying to the occupants of the vehicle. It is therefore an object of my invention to provide means whereby the frame may move relative to the fenders so that the vibrations of the frame are not apparent to the occupants of the vehicle.

Another object is to provide supporting means for the vehicle fenders whereby they are permitted to move with the body and relative to the chassis frame.

A further object is to provide means permitting relative movement between the fenders and frame at the front end of the frame.

A further object is to provide means rigidly connecting the radiator and fenders and mounting the same on the frame to permit movement thereof relative to the frame, they being constrained to move with the vehicle body.

A further object is to provide frame side members having a cross member therebetween, rubber cushioning members being interposed between the ends of the cross member and the side members, and said cross member having the engine, radiator and fenders, or any of them, rigidly mounted thereon, whereby the frame side members are permitted to have limited movement relative to the cross member and the vehicle parts mounted thereon.

A still further object is to provide a structure utilizing a mass such as the engine and/or the radiator to stabilize the movement of the fenders when driving the motor vehicle over rough roads, the fenders being mounted to move substantially with the vehicle body.

The above being among the objects of the present invention, the same consists of certain features of construction and combination of parts to be hereinafter described with reference to the accompanying drawings, and then claimed, having the above and other objects in view.

In the accompanying drawings which illustrate suitable embodiments of the present invention, Figure 1 is a fragmentary plan view of a motor vehicle showing my invention included therein.

Figure 1:
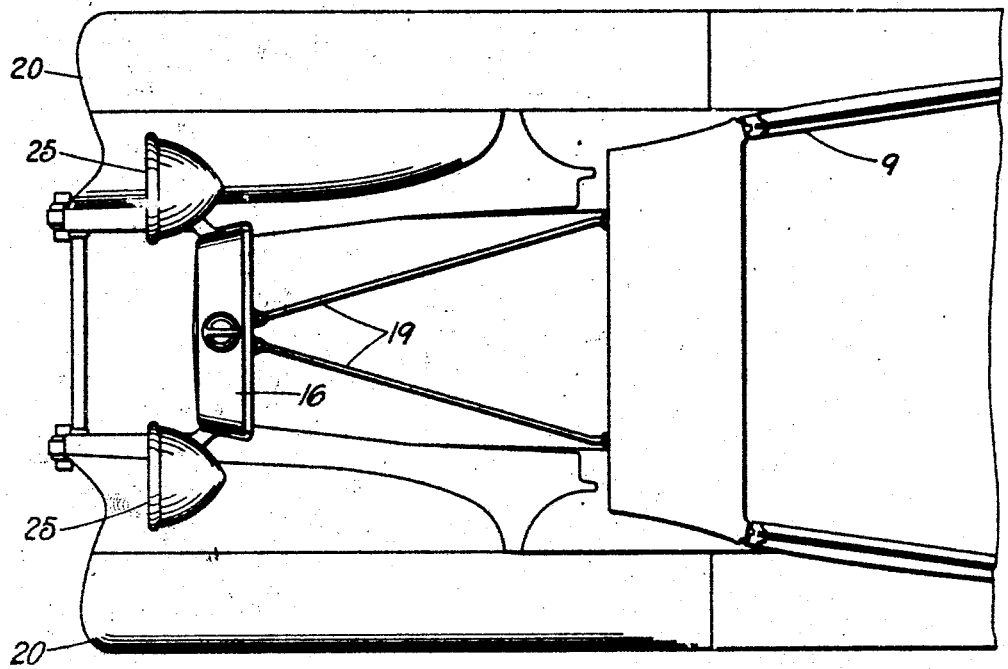
Figure 2:
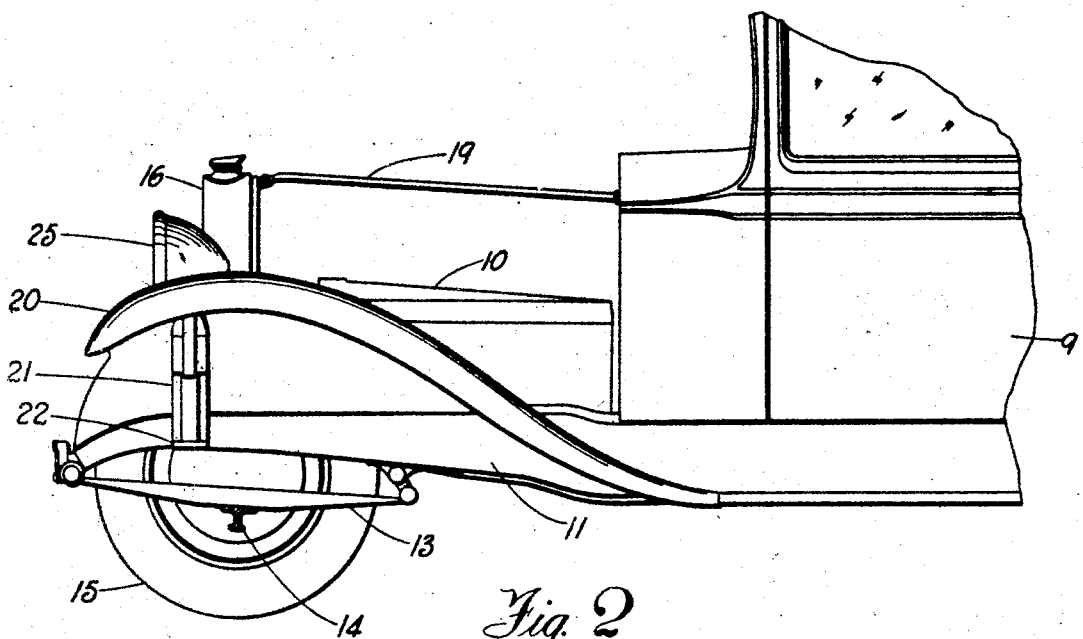
Figure 2 is a side elevation of the structure shown in Figure 1.
Figure 3:
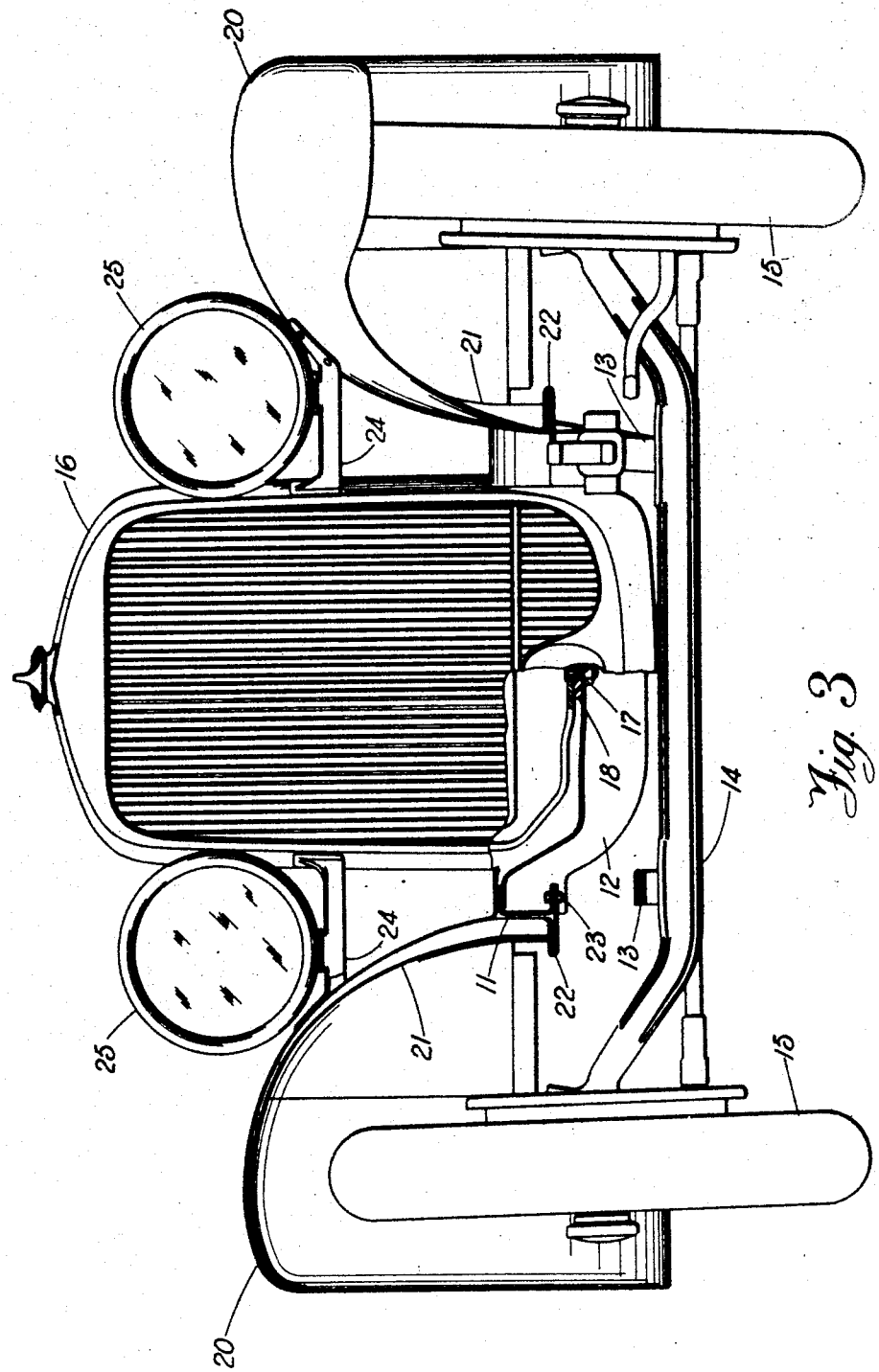
Figure 3 is an enlarged front elevational view of a motor vehicle showing the structures illustrated in the preceding views, certain parts being broken away and in section to better illustrate the invention.

Referring to the numbered parts of the drawings in which like numerals refer to like parts throughout the several views, and particularly to Figures 1, 2 and 3, I have shown a motor vehicle having a body 9, an engine 10, frame side rails 11, frame cross member 12, front springs 13 secured to the side frame members 11 and to the front axle 14 on which are pivotally mounted the road steering wheels 15. The radiator 16 is secured to the frame cross member 12 by means of the bolt 17, a rubber block 18 being positioned between the bottom face of the radiator 16 and the frame cross member 12 to permit movement of the frame cross member relative to the radiator.

The radiator 16 is attached to the body 9 by the braces 19 whereby the radiator is constrained to movement with the body. Fenders 20 for the road steering wheels 15 are provided with braces 21, the fenders and the braces being mounted in spaced relationship to the frame side rails 11. In the present adaptation, spring supporting members 22 for the fenders 20 are bolted at 23 to the lower flange of the frame cross member 11 and have their outer ends looped and secured to the fender brackets 21. Braces 24 extend between and are secured to the fenders 20 and the radiator 16 illustrated in Figure 3, the braces being adapted to support the headlamps 25.

As illustrated in Figures 1, 2 and 3, the front frame cross member 12 is rigidly connected with the frame side rails 11, the radiator 16 being mounted on the cross member 12 in a manner to permit relative movement therebetween. As the fenders 20 are mounted in spaced relation to the side frame members 11 and are supported by the spring supports 22, the frame is permitted to also have movement relative to the fenders, and the fenders 20 will be constrained against movement relative to the body 9 because of their rigid connection with the radiator 16 which in turn is rigid with the body. As the radiator 16 is connected by the braces 19 to the body 9 and the fenders 20 are rigidly connected with the radiator, both are constrained to movement with the body, and the frame is permitted to have movement relative thereto so that the vibratory movements of the frame are not transmitted to the fenders and radiator and the occupants of the vehicle will thus not be annoyed by the frame vibrations which have been heretofore transmitted directly to the fenders and/or radiator to cause serious vibration thereof.

Figure 4:
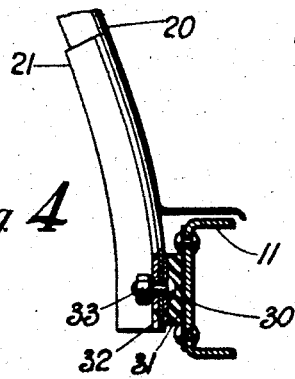
Figure 4 is a fragmentary sectional view showing a modified means for mounting a fender on the frame side member.

In Figure 4, I have shown the frame side member 11 as having a plate 30 riveted or otherwise secured thereto to which is preferably bonded a rubber block 31 having a plate 32 bonded by the opposite side thereof. The plate 32 is attached to the fender bracket 21 by means of the bolts 33 whereby the frame side member 11 is permitted to have movement relative to the fender 20, it being understood that the fender 20 is previously attached to the radiator or one of the other vehicle parts rigidly joined with the body 9 so that the fender 20 is constrained to move therewith.

Figure 5:
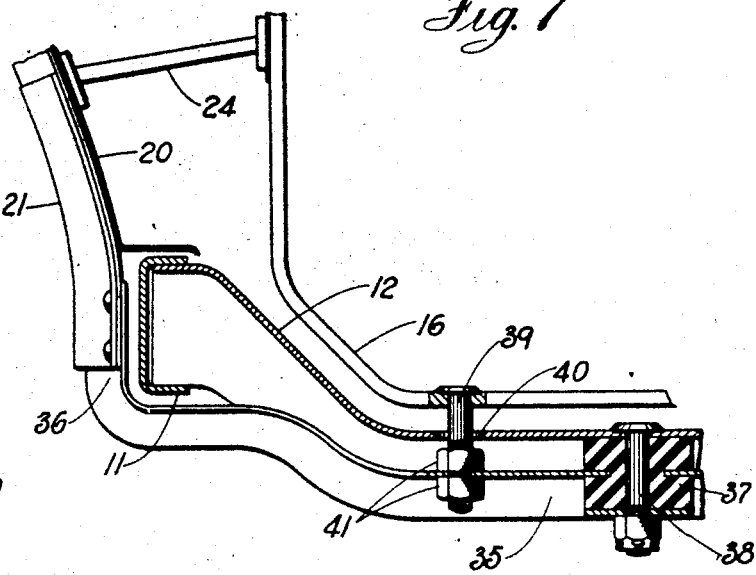
Figure 5 is a fragmentary sectional view showing modified means for mounting the fender and radiator on a frame cross member.

In Figure 5, I have shown a further modification in which the frame side members 11 have a frame cross member 12 rigidly secured therebetween intermediate the ends of which is supported a fender supporting cross member 35 having its ends bent upwardly at 36 and riveted or otherwise secured to the fender brackets 21 supporting the fenders 20. The cross member 35 is spaced from the frame cross member 12, a rubber block 37 being interposed therebetween, a bolt 38 being provided to hold the fender supporting cross member 35 in spaced relation to the frame cross member 12. The radiator 16 is preferably rigidly mounted on the fender supporting cross member 35 by means of the bolts 39 extending through openings 40 in the upper flange of the frame cross member 12 and secured to the upper flange of the fender supporting cross member 35 by means of the lock nuts 41. As in Figure 3, the fender 20 may be secured to the radiator 16 by means of the brace 24. In this construction, the chassis frame is permitted to have movement relative to the fender supporting member 35 due to the interposition of the rubber block 37 and as in the previously described construction, the radiator 16 and fenders 20 are constrained to move with the body 9 as the same are preferably secured therewith by means corresponding with the braces 19. The openings 40 in the frame cross member 12 are sufficiently large to permit free movement of the bolts 39 therein so that the frame is permitted to have the movement relative to the vehicle parts rigidly connected with the body, all as hereinbefore described.

Figure 6:
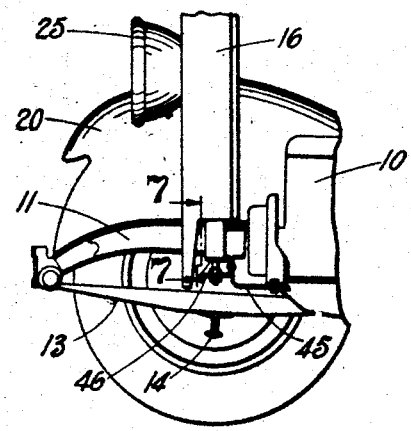
Figure 6 is a fragmentary side elevational view of a motor vehicle showing a modified engine and radiator mounting, certain parts being broken away and in section to better illustrate the invention.
Figure 7:
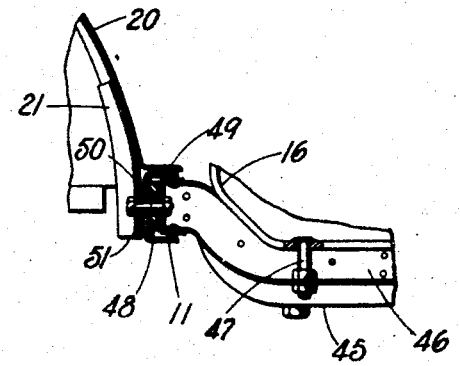
Figure 7 is a sectional view taken on the line 7—7 of Figure 6.

In Figures 6 and 7, I have shown the engine 10 as having a bracket 45 at the front end thereof rigidly connected with a cross member 46. The radiator 16 is also rigidly secured to the cross member 46 by means of the bolts 47. The cross member 46 has its ends positioned in spaced relation to the frame side rails 11, rubber blocks 48 being interposed therebetween to permit movement of the cross member 46 relative to the side members 11. Bolts 49 extend through the fender brackets 21, openings 50 in the side rails 11, the rubber blocks 48 and the end portions of the cross member 46, spacing members 51 being provided to maintain the fenders 20 in spaced relation to the side rails 11. The bolts 51 serve to rigidly unite the fenders with the cross member 46, the fenders also being optionally secured to the radiator 16 by the braces 24.

The engine, radiator and fenders are all mounted on or are rigidly connected with the cross member 46, the whole structure having sufficient means so that it will not follow the vibratory movements of the frame but will move substantially with the body. It will thus be seen that because of the resilient connection between the frame side rails 11 and the cross member 46 that the frame side members in this case are permitted to have movement relative to the engine, radiator and fenders so that vibrations or torsional movement of the frame is not transmitted to these other parts of the vehicle.

Figure 8:
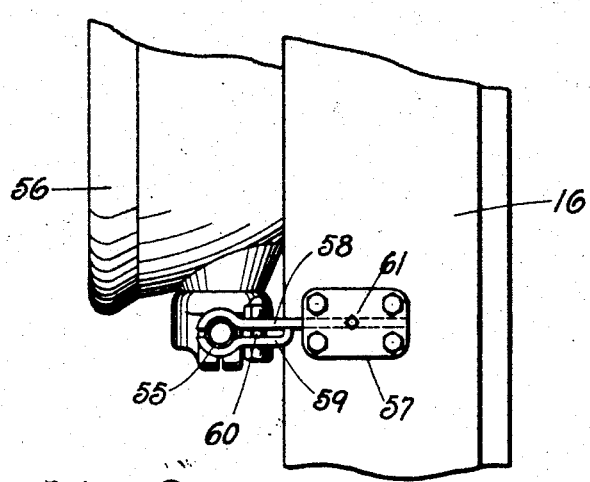
Figure 8 is a fragmentary elevational view showing further means for securing the headlamp to the radiator shell.

In Figure 8, I have shown a modified means for securing the fenders to the radiator which comprises a cross tube 55 extending between the fenders on which the headlamps 56 may be mounted. Plates 57 secured to the sides of the radiator 16 adjustably receive a clamping bar 58 having a curved face extending over a portion of the cross tube 55. A clamp 59 is secured to the member 58 by means of the bolt 60 so that the cross tube 55 is rigidly secured thereto. The member 58 is permitted to have movement in the plate 57 whereby the same may be adjustably secured therein and then clamped in position by means of the screw 61.

Although I have shown several modifications of my invention, it will be apparent that each structure permits movement of the frame relative to the fenders and radiator so that the vibrations of the frame are not transmitted to these several parts, and while I have shown and made a detailed description of my invention it is to be understood that formal changes and changes relating to details of construction and manufacture may be resorted to by those skilled in the art without departing from the spirit and substance of my invention, the scope of which is commensurate with the appended claims.

What I claim is:

1. In a motor vehicle, a frame, a radiator supported thereon having movement relative thereto, a fender resiliently supported by said frame in spaced relation thereto, and means rigidly connecting said fender and radiator whereby said fender and radiator are constrained against movement relative to each other and said frame is permitted to move relative to said radiator and fender.

2. In a motor vehicle, a frame, a radiator supported thereon having movement relative thereto, a fender in spaced relation to said frame, resilient means secured to said frame and fender to permit relative movement therebetween, and means rigidly connecting said fender and radiator whereby said fender and radiator are constrained against movement relative to each other and said frame is permitted to move relative thereto.

3. In a motor vehicle having a body, a frame, a radiator supported on said frame having movement relative thereto, bracing means rigidly connecting said radiator with said body, a fender in spaced relation to said frame, resilient means secured to said frame and fender to permit relative movement therebetween, and means rigidly connecting said fender and radiator whereby said fender and radiator are constrained to move with said body and said frame is permitted to move relative thereto.

4. In a motor vehicle, a chassis frame, fenders at opposite sides thereof, means rigidly connecting said fenders, and a rubber member interposed between said chassis frame and fender connecting means to permit limited movement of said chassis frame relative to said fenders.

5. In a motor vehicle, a chassis frame, fenders at opposite sides thereof, means rigidly connecting said fenders, resilient means interposed between said chassis frame and fender connecting means to permit limited movement of said chassis frame relative to said fenders, and a second means connecting said fenders and constraining said fenders against movement relative to each other.

6. In a motor vehicle, a frame, fenders at opposite sides thereof in spaced relation thereto, means connecting said fenders, a radiator supported on said fender connecting means, and resilient means interposed between said frame and fender connecting means to permit movement of said frame relative to said fenders and radiator.

7. In a motor vehicle, a frame, fenders at opposite sides thereof, means connecting said fenders, a radiator supported on said fender connecting means, resilient means interposed between said frame and fender connecting means to permit movement of said frame relative to said fenders and radiator, and a second means connecting said fenders and radiator to prevent movement therebetween.

8. In an automotive vehicle having a chassis frame and a body, a pair of front fenders, means rigidly securing said fenders to said body, and means resiliently securing said fenders to said chassis frame, whereby the said fenders positively follow the motions of the body but do not follow the vibratory motions of the chassis frame.

9. In an automotive vehicle a frame comprising side members and a transverse member rigidly supported by the side members, a radiator resiliently supported on the transverse member and a pair of fenders resiliently supported by the side members and rigidly secured to the radiator.

10. In an automotive vehicle, a frame comprising side members, and a transverse member resiliently supported by the side members, a radiator rigidly secured to the transverse member and a pair of fenders rigidly secured to the said transverse member and to said radiator.

11. In a motor vehicle, a chassis frame, a front fender having a support resiliently secured to said frame in spaced relation thereto, and means interposed between said frame and said support to permit limited movement of said frame relative to said support.

12. In a motor vehicle, a chassis frame, a front fender having a support resiliently secured to said frame in spaced relation thereto, means interposed between said support and said frame to permit limited movement of said frame relative to said fender, and means rigidly securing said fender to another part of said vehicle to constrain said fender against vibratory movement.

13. In a motor vehicle having a body, a chassis frame member, a front fender carried by said body in spaced relation to said frame member, resilient means secured to said frame member supporting said fender whereby said frame is permitted to have a limited movement relative to said fender, said fender being rigidly secured to said body and constrained to move therewith.

14. In a motor vehicle having frame side members, a frame cross member extending between said side members, a radiator and a pair of fenders rigidly mounted on said cross member, and resilient means interposed between said frame side members and said frame cross member whereby said frame cross member together with said radiator and fenders may have a limited movement relative to said frame side members, but said fenders and said radiator will be constrained to move together.

15. In a motor vehicle having frame side members, a frame cross member extending between said side members, an engine, a radiator, and a pair of front fenders rigidly mounted on said cross member and resilient means interposed between said frame side members and said frame cross member whereby said frame cross member together with said engine, said radiator and said fenders may have a limited movement relative to said frame side members, but said engine, said radiator and said fenders will be constrained to move together.

Signed by me at South Bend, Indiana, this 26th day of March, 1930.

CLYDE R. PATON.